July 25, 1967  D. B. POWELL  3,332,549

PACKAGES AND CONTAINERS

Filed Nov. 8, 1965

United States Patent Office 3,332,549
Patented July 25, 1967

3,332,549
PACKAGES AND CONTAINERS
Dennis Baden Powell, Mangotsfield, Bristol, England, assignor to The Robinson Waxed Paper Company Limited, Bristol, England, a company of Great Britain and Northern Ireland
Filed Nov. 8, 1965, Ser. No. 506,817
Claims priority, application Great Britain, Nov. 12, 1964, 46,219/64
12 Claims. (Cl. 206—56)

This invention relates to packages and containers made from sheet material.

It is well known that polypropylene resin is degraded by ionising radiation to varying degrees depending upon the dose of radiation applied, and conditions such as the temperature and the amount of oxygen present.

We have found that by using a sealing medium such as polypropylene for forming sealed areas on packages or containers and then subjecting the sealed areas to ionising radiations the sealing medium degrades thereby providing a seal which can readily be peeled open to gain access to the interior of the package or container.

The invention is particularly applicable to sterilised packages in which case the ionising radiations are applied after the product is packaged but the invention can also be applied to containers for packaging products which do not require ionising irradiation treatment in which case the ionising radiations can be applied before the product is packaged.

According to one aspect of the invention a package comprises two layers of sheet material bearing a sealing medium on their inner surfaces, a product between said layers, a sealed area joining said layers and surrounding said product, the said sealing medium in said sealed area being degraded by ionising radiations whereby the said seal is readily peeled open to gain access to the interior of the package.

According to another aspect of the invention the method of making a package comprises bringing two layers of sheet material face to face, the said layers bearing a sealing medium on their inner surfaces, placing a product between said layers, forming a sealed area joining said layers and surrounding said product, subjecting the package to ionising radiations to degrade the sealing medium.

The invention will now be described in its application to a package for a disposable surgical blade.

Figure 1:
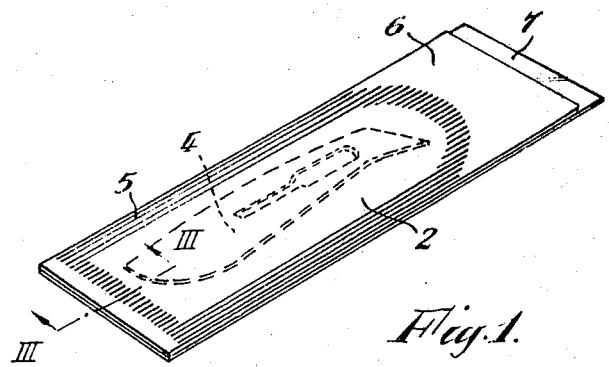
FIG. 1 is a perspective view of the package before opening.
Figure 2:
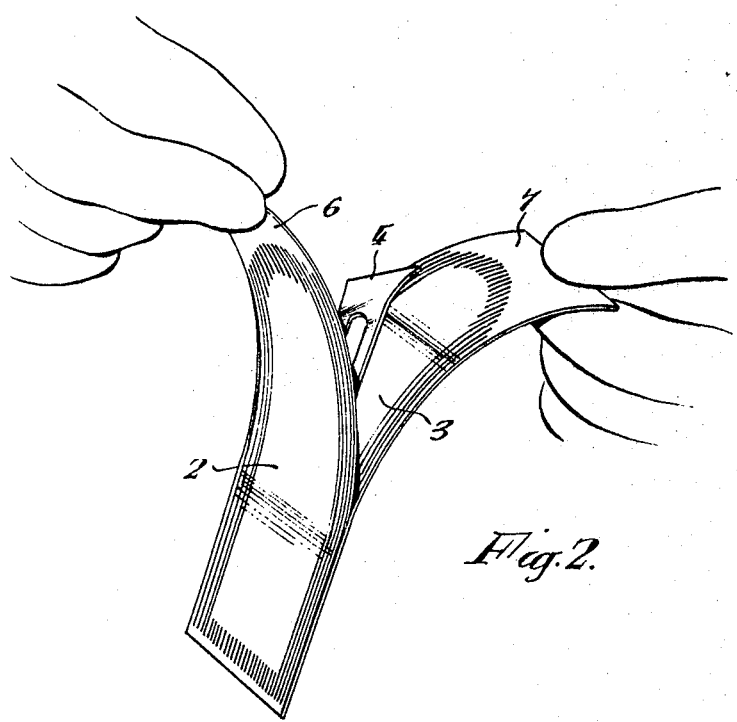
FIG. 2 is a perspective view of the package being opened.
Figure 3:
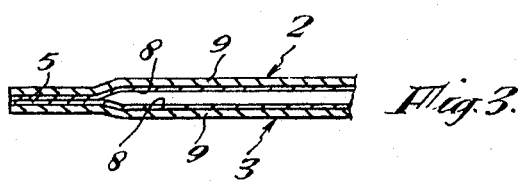
FIG. 3 is a section taken on line III—III of FIG. 1 shown to a greatly enlarged scale.

Referring to the drawing, a rectangular envelope comprises a front panel 2 and a back panel 3 made from a laminated material consisting of cast polypropylene film (0.018 mm.) laminated to aluminium foil (0.054 mm.) by means of a polypropylene cross linking laminate system. A surgical blade 4 is placed between the panels 2 and 3 and the package is heat sealed by a continuous area 5 surrounding the blade 4 and uniting the two panels 2 and 3. Preferably the area 5 is crimped and the said area is inset from one end of the envelope so as to provide two unadhered portions 6 and 7 externally of the sealed area which can be gripped between the fingers and thumbs so as to start a peeled opening of the package. FIG. 3 shows diagrammatically the marginal portion of the package. The polypropylene layer 8 on the inside of the aluminium layer 9 on both front and back panels 2 and 3 are heat sealed together to provide the seal 5.

The package and the blade is subjected to controlled treatment of gamma radiation (in this case a dose of 2.5 megarad) which not only sterilises the package but also embrittles the polypropylene film to a degree sufficient to allow the package to be easily peeled open exposing the blade for use. This particular dose of radiation is used commercially to sterilise a range of surgical equipment and it is found that this dose, although affecting the heat seal to a sufficient extent to give peeling qualities, does not have a marked deleterious effect on the package. Although this dose is used commercially for the sterilisation of surgical instruments it is also found suitable to achieve the required peeling qualities of the heat seals. Nevertheless, other doses of radiation may be found suitable to achieve the latter properties.

It is sometimes desired, by medical practitioners, to sterilise a package by normal autoclaving techniques. It has been found that this package, which has been previously sterilised by radiation, can be re-sterilised by autoclaving, with the peel qualities being retained. It should be noted that this package can be sterilised by autoclaving so that the package is not damaged and the contents are maintained in a sterilised state; the package cannot be peeled open, however, without radiation treatment.

It must be understood that grades of polypropylene film other than that described in the above example can be used and instead of cast polypropylene film oriented polypropylene can be used. The polypropylene can also be applied to the base material as a coating.

Instead of the laminated sheet material described in the example in which one ply of polypropylene film is laminated to aluminium foil as the base material, other base materials can be used for example, paper, polyester film, polyamide film, polyolefin film, cellulose acetate film or regenerated cellulose film or combinations of such materials. For example, a polyester film (0.025 mm.) laminated to polypropylene film (0.018 mm.) has been found to be suitable. Combinations of these laminated sheet materials can be used to give either a fully opaque package, a fully transparent package or a package one side of which is opaque and with one side transparent. Thus the package in the example described is fully opaque, but substituting for both the panels 2 and 3 a polyester film laminated to a polypropylene film the package will be fully transparent. By substituting for only one of the panels 2 or 3 the same laminated sheet material one side will be opaque and one side will be transparent.

The laminating system used for making the laminated sheet material may be other adhesive systems or an extruded resin system such as polyethylene.

The heat sealing referred to can be carried out by means of heated bars or by impulse application or dielectric heating, for example by microwaves, ultra high frequency, high frequency or radio frequency. Induction heating can also be used. The seals can also be made by ultrasonic methods.

The ionising radiations for treating the package may be carried out by electro magnetic radiation using (a) gamma rays from an isotope source or (b) X-rays from an accelerator machine, or by electron radiations using either (a) or (b) above.

It is obvious that products other than the blades described can be packaged. If the package is to contain a product which is unacceptable if treated with ionising radiations, then the package is not treated after the product has been placed inside and instead the container is treated with the ionising radiations before the product is packaged. The container can be formed by any of the methods mentioned above. Instead of sealing the two panels together continuously around the product to be packaged the sealed area can be reduced to suit individual requirements provided that there is one peelable seal and at least one opening for the insertion of the product which opening is subsequently sealed. If desired the product can be vacuum packed.

Instead of the package being in the form of an envelope and comprising two panels, it may be a two part container in which one part is a dished container and the other part a cover both parts bearing a sealing medium on their inner surfaces. The said parts are brought face to face, sealed and irradiated as previously described.

What I claim and desired to secure by Letters Patent is:

1. Package comprising two layers of sheet material bearing a sealing medium on their inner surfaces, a product between said layers, a sealed area joining said layers and surrounding said product, the said sealing medium in said sealed area being degraded by ionising radiations whereby the said seal is readily peeled open to gain access to the interior of the package.

2. Package according to claim 1 wherein the said sheet material is a laminated material comprising a base sheet material laminated to polypropylene film.

3. Package according to claim 1 wherein the sheet material is a laminated material comprising aluminium foil laminated to cast polypropylene film.

4. Package according to claim 1 wherein at least part of said sealed area is inset from one edge of the package.

5. Method of making a seal which comprises bringing two layers of sheet material face to face, the said layers bearing a sealing medium on their inner surfaces, forming a sealed area joining said layers and subjecting the sealed area to ionising radiations to degrade the sealing medium.

6. Method of making a seal according to claim 5 wherein the sealing medium is polypropylene.

7. Method of making a seal according to claim 5 wherein the sealing medium is polypropylene film and the thickness of the polypropylene film is 0.018 mm. and the seal is treated to gamma radiation, the dosage being 2.5 megarad.

8. Container comprising two layers of sheet material bearing a sealing medium on their inner surfaces, and a sealed area joined said layers, the sealing medium being degraded by ionising radiations.

9. Container according to claim 8 wherein the container is substantially rectangular and the heat sealed area extends along three sides thereof.

10. Container according to claim 8 wherein the sealing medium is polypropylene.

11. Package comprising two parts, one part being a dished container and the other a cover, both parts bearing a sealing medium on their inner surfaces, a product between said parts, a sealed area joining said parts and surrounding said product, the sealing medium in said sealed area being degraded by ionising radiations whereby the said seal is readily peeled open to gain access to the interior of the package.

12. Package according to claim 11 wherein the sealing medium is polypropylene.

References Cited
UNITED STATES PATENTS

| | | | |
|---|---|---|---|
| 2,751,074 | 6/1956 | Ringlen et al. | 206—56 X |
| 2,936,261 | 5/1960 | Cole. | |
| 2,945,792 | 7/1960 | Miller. | |
| 2,954,116 | 9/1960 | Maso, et al. | 206—56 |
| 2,994,632 | 8/1961 | Brown, et al. | |
| 2,997,170 | 8/1961 | Lowry, et al. | |
| 2,998,880 | 9/1961 | Ladd | 206—56 X |
| 3,146,146 | 8/1964 | Anderson. | |

LOUIS G. MANCENE, *Primary Examiner.*

THERON E. CONDON, *Examiner.*

J. M. CASKIE, *Assistant Examiner.*